United States Patent [19]
Reed et al.

[11] Patent Number: 5,178,889
[45] Date of Patent: Jan. 12, 1993

[54] USE OF LOW FAT COCOA POWDER IN NON-TACK GUM BASE

[75] Inventors: Michael A. Reed, Evanston, Ill.; Steven P. Synosky, Green Brook, N.J.

[73] Assignee: Wm. Wrigley Jr. Company, Chicago, Ill.

[21] Appl. No.: 799,171

[22] Filed: Nov. 27, 1991

Related U.S. Application Data

[63] Continuation-in-part of Ser. No. 593,248, Oct. 5, 1990, abandoned.

[51] Int. Cl.$^5$ ............................................... A23G 3/30
[52] U.S. Cl. ........................................ 426/3; 426/4; 426/6; 426/631
[58] Field of Search ........................... 426/3, 4, 6, 631

[56] References Cited

U.S. PATENT DOCUMENTS

| | | | |
|---|---|---|---|
| 3,984,574 | 10/1976 | Comollo | 426/4 |
| 4,242,323 | 12/1980 | Vlock | 424/58 |
| 4,315,035 | 2/1982 | Basa et al. | 426/250 |
| 4,604,287 | 8/1986 | Glass et al. | 426/5 |
| 4,889,726 | 12/1989 | Dave et al. | 426/3 |
| 4,889,727 | 12/1989 | Dave et al. | 426/3 |

OTHER PUBLICATIONS

"Extrusion: Does Chewing Gum Pass The Test?", Food Manufacture, Sep. 1987, pp. 47, 49–50.
Minifie, "Chocolate, Cocoa And Confectionery: Science And Technology", Second Edition (1980), pp. 55–56.

*Primary Examiner*—Donald E. Czaja
*Assistant Examiner*—Evan Federman
*Attorney, Agent, or Firm*—Willian Brinks Olds Hofer Gilson & Lione

[57] ABSTRACT

A chewing gum base is provided which has a high fat and oil content for improved non-tack properties, and which contains a minor amount of low fat cocoa powder having no more than about 1.0 weight per cent fat content. Minor amounts of low fat cocoa powder constituting about 0.3 to about 2.4 weight per cent of the gum base, significantly reduce or eliminate the fat and oil tastes resulting from the inclusion of up to about 50 weight per cent fat and oil containing substances. An improved chewing gum is also provided which has a higher quality taste and which contains the gum base of the invention.

34 Claims, No Drawings

«5,178,889»

USE OF LOW FAT COCOA POWDER IN NON-TACK GUM BASE

RELATED APPLICATIONS

This application is a continuation-in-part of U.S. application Ser. No. 07/593,248, now abandoned, filed on Oct. 5, 1990, now abandoned, the entire disclosure of which is incorporated herein by reference.

FIELD OF THE INVENTION

This invention relates to the use of low fat cocoa powder to reduce the oily, fatty taste of non-tack gums which commonly results from relatively high concentrations of fat and oil present in the non-tack gum base. The invention includes both a non-tack gum base and a non-tack chewing gum which have a cleaner, less fatty and less oily taste.

BACKGROUND OF THE INVENTION

U.S. Pat. No. 3,984,574, issued to Comollo discloses a non-tack or abhesive chewing gum base whose abhesive characteristics are achieved, in part, by the inclusion of fat-containing and oil-containing sub-stances such as hydrogenated vegetable oils or animal fats. Specifically, the gum base of Comollo includes about 5-35% elastomers, 5-50% hydrogenated or partially hydrogenated vegetable oils or animal fats, 5-40% mineral adjuvants, 0-55% polyvinyl acetate, 0-20% fatty acids, and 0-10% monoglycerides or diglycerides of fatty acids, by weight of the gum base. This particular non tack base has a very high overall level of fats, oils, and fatty acids, and does not contain tack-producing rosins or natural gums.

The non-tack properties of the Comollo-type gum base are particularly apparent when the gum base contains about 20% by weight or more total of vegetable oils and animal fats, and are further optimized when the gum base contains 30% by weight or more total of vegetable oils and animal fats. However, there is a disadvantage associated with high fat and oil-containing gum bases. Because of their high fat and oil content, the taste of the fat and oil can be noticed when a chewing gum is prepared from these gum bases. This fat and oil taste can lead to a negative consumer reaction.

SUMMARY OF THE INVENTION

It has been discovered that when low fat cocoa powder containing less than about 1.0 weight per cent fat is added to a Comollo-type gum base, the fat and oil taste of the non-tack gum base and chewing gum can be substantially reduced or eliminated. In order to accomplish this effect, the low fat cocoa powder need only be present in a concentration of about 0.3 to about 2.4 per cent by weight of the gum base. This small amount of low fat cocoa powder can effectively "treat" (i.e. substantially reduce or eliminate the fat and oil taste of) gum bases which contain up to about 50 per cent combined weight of vegetable oils and animal fats.

Accordingly, it is a feature and advantage of the invention to provide a fat and oil containing non-tack chewing gum base which has little or no fat and oil taste.

It is also a feature and advantage of the invention to provide an improved non-tack chewing gum which has little or no fat and oil taste.

The foregoing and other features and advantages will become further apparent from the following detailed description of the presently preferred embodiments, when read in conjunction with the accompanying examples. It should be understood that the detailed description and examples are illustrative rather than limitative, the scope of the present invention being defined by the appended claims and equivalents thereof.

DETAILED DESCRIPTION OF THE PRESENTLY PREFERRED EMBODIMENTS

The present invention involves the use of a relatively small amount of low fat cocoa powder to obliterate a substantial amount of off-taste which would otherwise result from the use of a relatively large quantity of fat and oil containing substances in a non-tack chewing gum base. The non-tack chewing gum base of the invention contains about 0.3 to about 2.4 weight per cent of a low fat cocoa powder. Preferably, the non-tack chewing gum base of the invention contains about 0.3 to about 1.2 weight per cent low fat cocoa powder, and most preferably about 0.5 weight per cent low fat cocoa powder. The term "low fat cocoa powder" is defined herein as a cocoa powder whose fat content is no greater than about 1 0% by weight. It should be noted that typical cocoa powders which have not been defatted ordinarily contain upwards of 20% by weight fat.

While the inventors do not wish to be bound to any particular theory of how the invention works, it has been hypothesized that cocoa powder containing less than about 1.0% fat may absorb some of the fat and oil tastes associated with gum bases high in oil and fat. However, this hypothesis alone does not explain how cocoa powder present in concentrations of about 0.3 to about 2.4 weight per cent can substantially obliterate the fat and oil taste from gum bases which contain as high as about 50 weight per cent combined of animal fats and vegetable oils.

The stated upper limit of about 2.4 weight per cent cocoa powder has been selected because that amount of cocoa powder in the chewing gum base should not impart a noticeable chocolate flavor to the chewing gum. Reference is made to U.S. Pat. No. 4,889,727, issued to Dave et al. If the non-tack chewing gum of the invention has a flavor profile which would not be damaged by additional chocolate flavor, then greater than 2.4 per cent cocoa powder, by weight of the gum base, may be utilized. The preferred concentrations of low fat cocoa powder will, of course, vary somewhat depending on the particular types and concentrations of fat and oil containing ingredients in the gum base.

In addition to the low fat cocoa powder, the non-tack chewing gum base contains about 5 to about 35 weight per cent elastomer. Suitable elastomers include polyisobutylene, polyisoprene, isobutylene-isoprene copolymer, butadiene-styrene copolymer, and combinations thereof. The preferred elastomers are poly-isobutylene, isobutylene-isoprene copolymer, and combinations thereof. Preferably, the elastomer constitutes about 20 to about 35 per cent by weight of the gum base, most preferably about 22 to about 30 per cent by weight of the gum base.

The non-tack chewing gum base also contains about 5 to about 50 weight per cent of hydrogenated and/or partially hydrogenated oils and fats. The preferred oils include plant oils such as hydrogenated soybean oil, hydrogenated cottonseed oil, hydrogenated vegetable oil, and combinations thereof. Other fats and oils include, but are not limited to, tallow, hydrogenated tallow, and cocoa butter. Preferably, the hydrogenated and/or partially hydrogenated oils and fats constitute about 20 to about 50 weight per cent of the gum base, most preferably about 30 to about 40 weight per cent of the gum base. In a highly preferred embodiment, the non-tack gum base contains about 13 weight per cent hydrogenated soybean oil, about 13 weight per cent hydrogenated cottonseed oil and about 10 weight per cent hydrogenated vegetable oil.

The non-tack chewing gum base includes about 5 to about 40 weight per cent of a filler such as calcium carbonate, talc, tricalcium phosphate, or combinations thereof. Preferably, the filler constitutes about 5 to about 30 per cent by weight of the gum base, most preferably about 10 to about 20 per cent by weight of the gum base. The preferred filler is calcium carbonate.

The non-tack chewing gum base includes 0 to about 55 weight per cent polyvinyl acetate, preferably about 10 to about 40 weight per cent polyvinyl acetate and most preferably about 15 to about 25 weight per cent polyvinyl acetate. Preferably, the polyvinyl acetate has a low molecular weight, most preferably about 2000 to about 12,000.

The non-tack chewing gum base includes 0 to about 20 weight per cent fatty acids and 0 to about 10 weight per cent monoglycerides or diglycerides of fatty acids. Preferably, the non-tack gum base contains up to about 10 weight per cent glycerol monostearate. The non-tack gum base may also contain about 0.01 to about 0.10 weight per cent of an antioxidant and about 0.01 to about 0.2 weight percent of a coloring agent.

Small amounts of waxes and elastomer solvents such as polyterpenes which do not result in tack, may also be included in the non-tack gum base. When used, waxes such as candelilla wax, paraffin wax, carnauba wax, microcrystalline wax, and the like, can be present in an amount of about 0.1 to about 10% by weight of the gum base, preferably about 3% to about 7% by weight of the gum base. When used, terpene resins can constitute about 0.1% to about 20% by weight of the gum base, preferably about 5% to about 15% by weight of the gum base.

The ingredients of the non tack gum base can be combined in a conventional manner. In particular, the elastomers, hydrogenated and partially hydrogenated fats and oils, mineral adjuvants, polyvinyl acetate, fatty acids, mono and diglycerides of fatty acids, and cocoa powder can be added to a mixer such as a high shear or Sigma blade mixer. The batch is preferably heated slowly at a temperature of about 110° C. to 120° C., while mixing at constant heat for a time sufficient to ensure a homogeneous mass. The mass can be formed into slabs or pellets and allowed to cool before making non-tack chewing gum. Alternatively, the molten mass can be used directly in a chewing gum making process.

The preferred method of removing the fat and oil taste from the non-tack gum base is to add the low fat cocoa powder directly into the gum base. Alternatively, the cocoa powder can be added to the gum base with the remainder of the chewing gum ingredients. In this alternative embodiment, the amount of low fat cocoa powder should likewise be about 0.3 to about 2.4 per cent by weight of the non-tack gum base.

The gum base constitutes about 5 to about 95 weight per cent of the non-tack chewing gum, more typically about 10 to about 50 weight per cent of the chewing gum, and most commonly about 20 to about 30 weight per cent of the chewing gum. In addition to a gum base, a non-tack chewing gum typically contains a generally water soluble bulk portion and one or more flavoring agents. The water soluble portion dissipates over a period of time during chewing. The gum base portion is retained in the mouth throughout the chewing process.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5-15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5-95% by weight of the chewing gum, more typically 20-80% by weight of the chewing gum and most commonly 30-60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001-5% by weight of the chewing gum, preferably between 0.01-1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

Flavoring agents should generally be present in the chewing gum in an amount within the range of about 0.1-15% by weight of the chewing gum, preferably between about 0.2-5% by weight of the chewing gum, most preferably between about 0.5-3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLES 1 AND 2

Non-tack chewing gum bases were made according to the following formulations:

| Component | Percent By Weight | |
|---|---|---|
| | Example 1 (Control) | Example 2 |
| Antioxidant (BHT) | 0.04 | 0.04 |
| Hydrogenated cottonseed oil | 13.3 | 13.2 |
| Hydrogenated soybean oil | 13.3 | 13.2 |
| Hydrogenated vegetable oil | 9.82 | 9.76 |
| Glycerol monostearate | 2.7 | 2.7 |
| Low molecular weight polyvinyl acetate | 21.7 | 21.6 |
| Polyisobutylene | 15.9 | 15.9 |
| Isoprene-isobutylene copolymer | 9.9 | 9.9 |
| Artificial color | 0.09 | — |
| Calcium carbonate | 13.25 | 13.2 |
| Defatted cocoa powder | — | 0.50 |
| TOTAL | 100.0 | 100.0 |

EXAMPLES 3 AND 4

Spearmint-flavored gums were produced using the bases of Examples 1 and 2, according to the following formulations:

| Component | Percent By Weight | |
|---|---|---|
| | Example 3 (Control) | Example 4 |
| Base (Example 1) | 19.80 | — |
| Base (Example 2) | — | 19.80 |
| Sugar | 59.83 | 59.83 |
| Corn syrup | 18.40 | 18.40 |
| Glycerin | 0.70 | 0.70 |
| Sorbitol | 0.68 | 0.68 |
| Spearmint flavor | 0.59 | 0.59 |
| TOTAL | 100.0 | 100.0 |

The gums of Examples 3 and 4 were sensory evaluated by a panel consisting of four trained panelists. The sensory evaluation suggested that the chewing gum of Example 4 was drier and softer than the gum of Example 3, and also that the gum of Example 4 had a sharper, cleaner flavor with less fatty character.

EXAMPLES 5 AND 6

Additional chewing gum samples were produced on a larger scale using the non-tack gum bases of Examples 1 and 2. The chewing gum sample of Example 5 had the same formulation as for Example 3. The chewing gum sample of Example 6 had the same formulation as for Example 4. The samples of Examples 5 and 6 were sensory evaluated by a panel consisting of four trained panelists. The results indicated that the chewing gum of Example 6 was slightly softer and had a cleaner, sharper aroma and a cleaner, sharper, less fatty and longer lasting flavor.

The chewing gum samples were also tested in consumer blind tests of 152 people. The chewing gum of Example 6 showed a significant overall preference based on improved flavor, improved sweetness, long lasting flavor and less bitterness.

EXAMPLES 7 AND 8

Peppermint flavored gums were made using the bases of Examples 1 and 2, according to the following formulations:

| Component | Percent By Weight | |
|---|---|---|
| | Example 7 (Control) | Example 8 |
| Base (Example 1) | 20.2 | — |
| Base (Example 2) | — | 20.2 |
| Sugar | 58.82 | 58.82 |
| Corn syrup | 18.7 | 18.7 |
| Glycerin | 0.69 | 0.69 |
| Sorbitol | 0.89 | 0.89 |
| Spearmint flavor | 0.70 | 0.70 |
| TOTAL | 100.0 | 100.0 |

The chewing gum samples of Examples 7 and 8 were sensory evaluated using a panel consisting of four trained panelists. The panelists found that the gum of Example 8 was softer and less waxy in texture and the flavor was cleaner with fewer fatty notes, than the gum of Example 7. Also, the gum of Example 8 had a better flavor balance, a fresher character, and a slightly longer lasting flavor.

The samples of Examples 7 and 8 were also tested in consumer blind tests of 152 people. The gum of Example 8 was significantly preferred over the gum of Example 7 based on improved flavor character, stronger flavor, longer lasting flavor and less bitter taste.

The foregoing tests all demonstrate that low levels of low fat cocoa powder used in high fat and oil containing base improves flavor quality and reduces fat and oil tastes.

While the embodiments of the invention disclosed herein are presently considered to be preferred, various modifications and improvements can be made without departing from the spirit and scope of the invention. The scope of the invention is indicated in the appended claims, and all changes which come within the meaning and range of equivalency of the claims are intended to be embraced therein.

We claim:

1. A non-tack chewing gum base, comprising: about 5 to about 35 weight per cent elastomer;

about 20 to about 50 combined weight per cent of hydrogenated and partially hydrogenated oils and fats;

about 5 to about 40 weight per cent filler;

0 to about 55 weight per cent polyvinyl acetate;

0 to about 20 weight per cent fatty acids;

0 to about 10 combined weight per cent of monoglycerides and diglycerides of fatty acids; and about 0.3 to about 2.4 weight per cent of a low fat cocoa powder;

the low fat cocoa powder having no more than about 1.0 weight per cent fat content.

2. The non-tack chewing gum base of claim 1, wherein the low fat cocoa powder comprises cocoa powder which has been defatted.

3. The non-tack chewing gum base of claim 1, wherein the low fat cocoa powder constitutes about 0.3 to about 1.2 weight per cent of the gum base.

4. The non-tack chewing gum base of claim 1, wherein the low fat cocoa powder constitutes about 0.5 weight per cent of the gum base.

5. The non-tack chewing gum base of claim 1, wherein the hydrogenated and partially hydrogenated oils and fats constitute about 30 to about 40 combined weight per cent of the gum base.

6. The non-tack chewing gum base of claim 1, wherein the hydrogenated and partially hydrogenated oils are of plant origin.

7. The non-tack chewing gum base of claim 1, wherein the fats are of animal origin.

8. The non-tack chewing gum base of claim 1, wherein the elastomer constitutes about 20 to about 35 weight per cent of the gum base.

9. The non-tack chewing gum base of claim 1, wherein the elastomer constitutes about 22 to about 30 weight per cent of the gum base.

10. The non-tack chewing gum base of claim 1, wherein the elastomer is selected from the group consisting of polyisobutylene, isobutylene-isoprene copolymer, butadiene-styrene copolymer, polyisoprene, and combinations thereof.

11. The non-tack chewing gum base of claim 1, wherein the elastomer is selected from the group consisting of polyisobutylene, isobutylene-isoprene copolymer, and combinations thereof.

12. The non-tack chewing gum base of claim 1, wherein the filler constitutes about 5 to about 30 weight per cent of the gum base.

13. The non-tack chewing gum base of claim 1, wherein the filler constitutes about 10 to about 20 weight per cent of the gum base.

14. The non-tack chewing gum base of claim 1, wherein the filler is selected from the group consisting of calcium carbonate, talc, tricalcium, phosphate, and combinations thereof.

15. The non-tack chewing gum base of claim 1, wherein polyvinyl acetate constitutes about 10 to about 40 weight per cent of the gum base.

16. The non-tack chewing gum base of claim 1, wherein polyvinyl acetate constitutes about 15 to about 25 weight per cent of the gum base.

17. The non-tack chewing gum base of claim 1, wherein the monoglycerides of fatty acids comprise glycerol monostearate.

18. The non-tack chewing gum base of claim 1, further comprising about 0.1 to about 10 weight per cent wax selected from the group consisting of candelilla wax, paraffin wax, carnauba wax, microcrystalline wax, and combinations thereof.

19. The non-tack chewing gum base of claim 18, wherein the wax constitutes about 3 to about 7 weight per cent of the gum base.

20. The non-tack chewing gum base of claim 1, further comprising about 0.1 to about 20 weight per cent of one or more terpene resins.

21. The non-tack chewing gum base of claim 20, wherein the one or more terpene resins constitute about 5 to about 15 weight per cent of the gum base.

22. A method for reducing the fat and oil taste in a chewing gum base which contains about 20 to about 50 combined weight per cent of hydrogenated and partially hydrogenated fats and oils, comprising the step of adding about 0.3 to about 2.4 weight per cent low fat cocoa powder to the gum base, the cocoa powder having a fat content of no more than about 1.0 weight per cent.

23. The method of claim 26, wherein the cocoa powder is added during manufacture of the gum base.

24. The method of claim 22, wherein the cocoa powder is added to the gum base during manufacture of chewing gum.

25. The method of claim 22, wherein the gum base contains about 30 to about 40 combined weight per cent of hydrogenated and partially hydrogenated fats and oils.

26. The method of claim 22, wherein the cocoa powder is added in an amount of about 0.3 to about 1.2 weight per cent of the gum base.

27. The method of claim 22, wherein the cocoa powder is added in an amount of about 0.5 weight per cent of the gum base.

28. A chewing gum, comprising:
a generally water-soluble bulk portion;
one or more flavoring agents; and
a chewing gum base comprising an elastomer, a filler, about 20 to about 50 combined weight per cent of hydrogenated and partially hydrogenated fats and oils, and about 0.3 to about 2.4 weight per cent of a low fat cocoa powder having no more than about 1.0 weight per cent fat content.

29. The chewing gum of claim 28, wherein the gum base constitutes about 10 to about 50 weight per cent of the chewing gum.

30. The chewing gum of claim 28, wherein the gum base constitutes about 20 to about 30 weight per cent of the chewing gum.

31. The chewing gum of claim 28, wherein the hydrogenated and partially hydrogenated fats and oils constitute about 30 to about 40 combined weight per cent of the gum base.

32. The chewing gum of claim 28, wherein the low fat cocoa powder constitutes about 0.3 to about 1.2 weight per cent of the gum base.

33. The chewing gum of claim 28, wherein the low fat cocoa powder constitutes about 0.5 weight per cent of the gum base.

34. The chewing gum of claim 28, wherein the elastomer is selected from the group consisting of polyisobutylene, isobutylene-isoprene copolymer, and combinations thereof.

* * * * *